H. A. MAVOR.
POWER INSTALLATION FOR THE PROPULSION OF MARINE VESSELS AND FOR OTHER PURPOSES.
APPLICATION FILED JULY 1, 1911.
1,071,070.
Patented Aug. 26, 1913
5 SHEETS—SHEET 2.
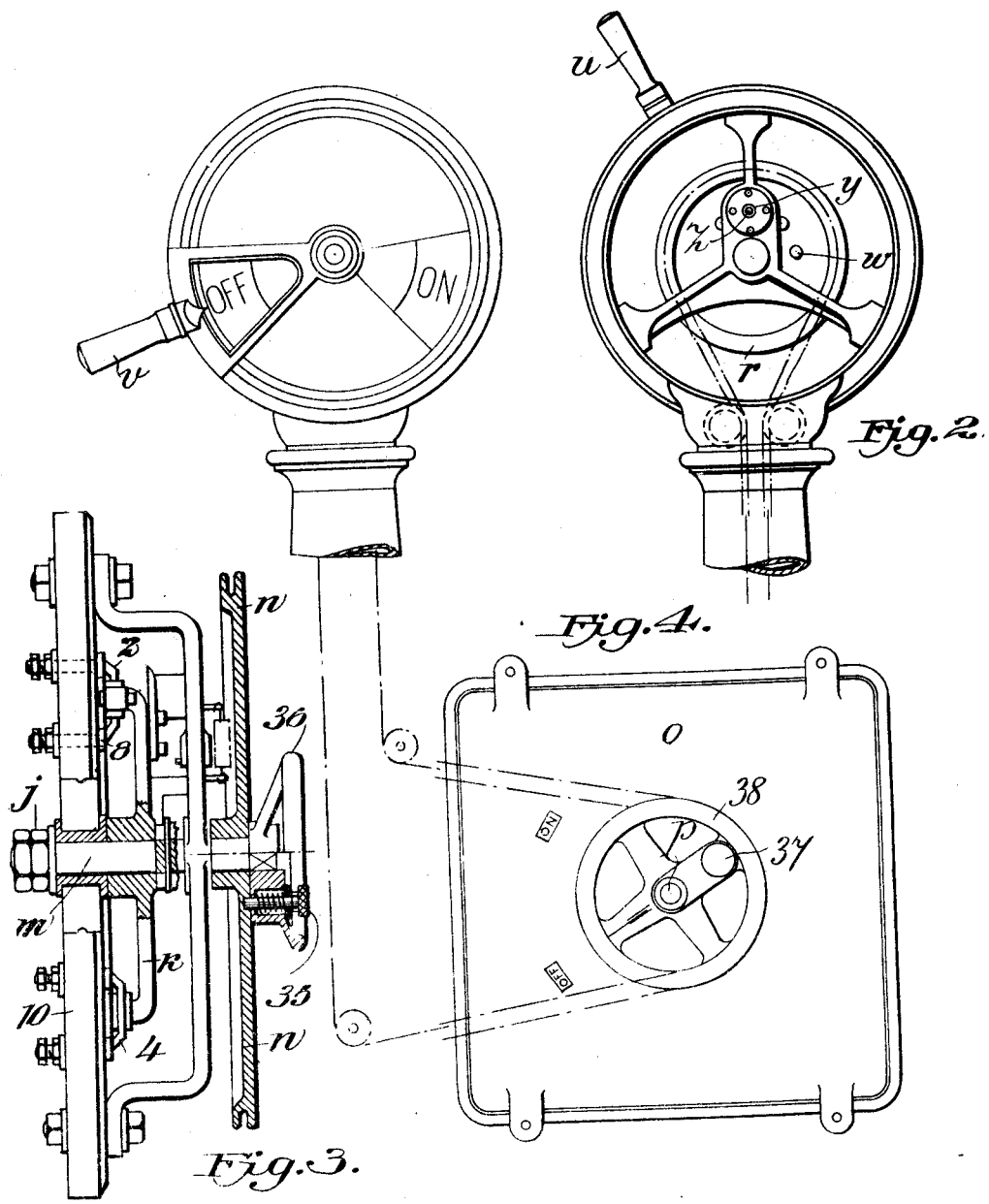

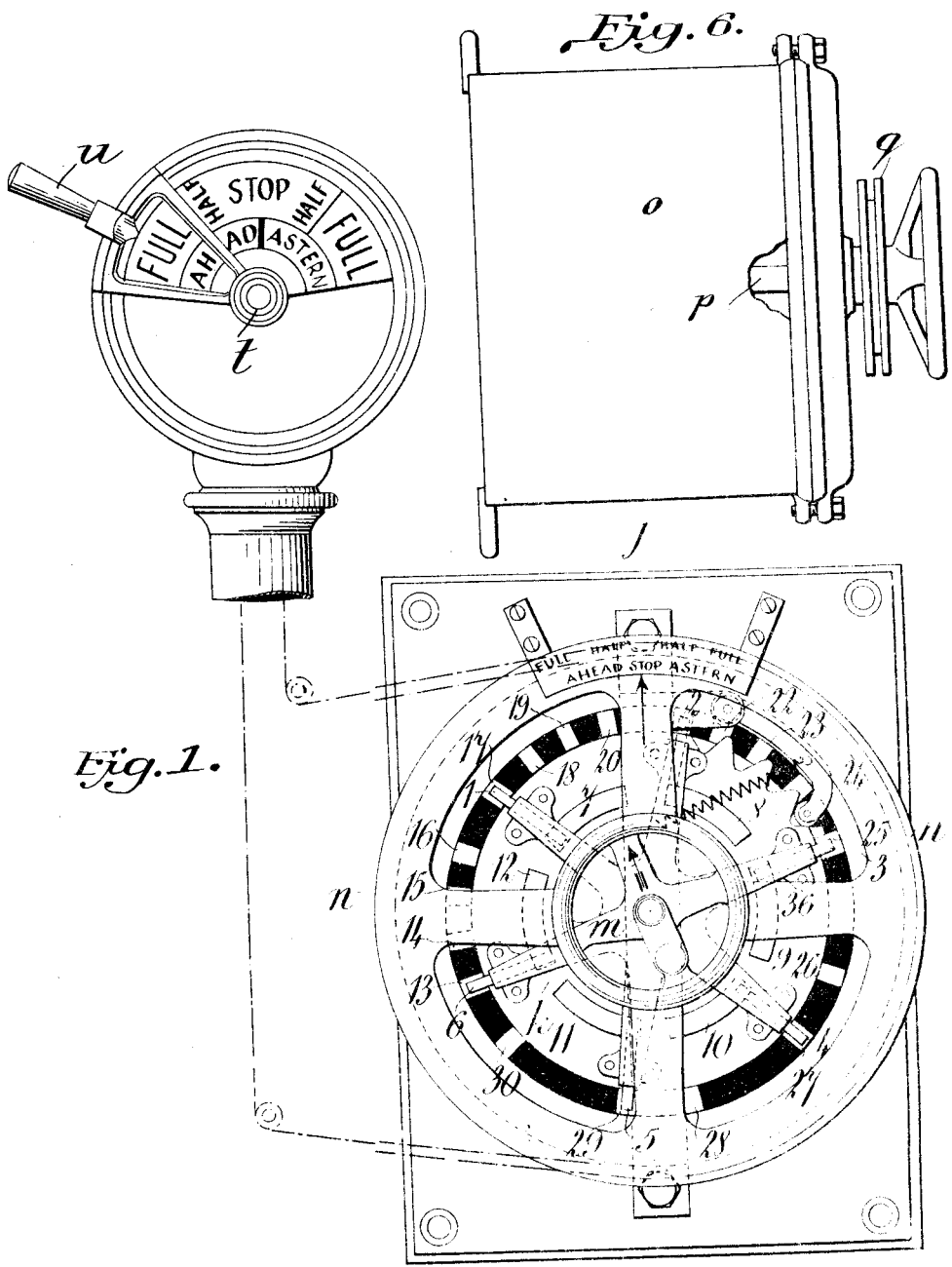

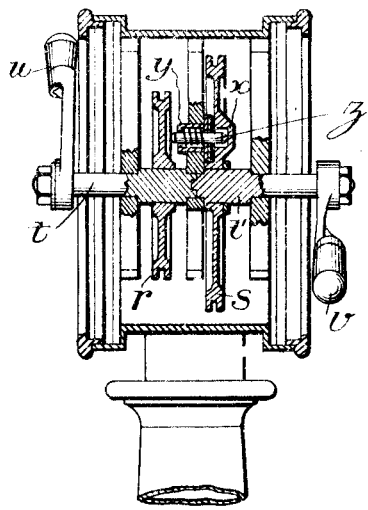
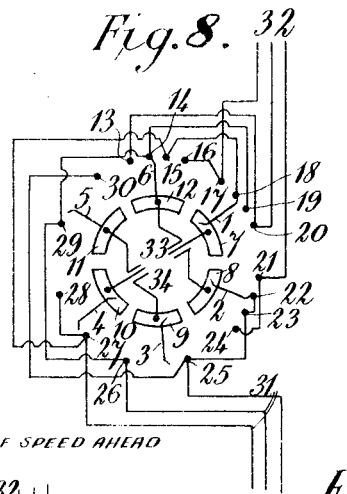

H. A. MAVOR.
POWER INSTALLATION FOR THE PROPULSION OF MARINE VESSELS AND FOR OTHER PURPOSES.
APPLICATION FILED JULY 1, 1911.
1,071,070.
Patented Aug. 26, 1913.
5 SHEETS—SHEET 4.
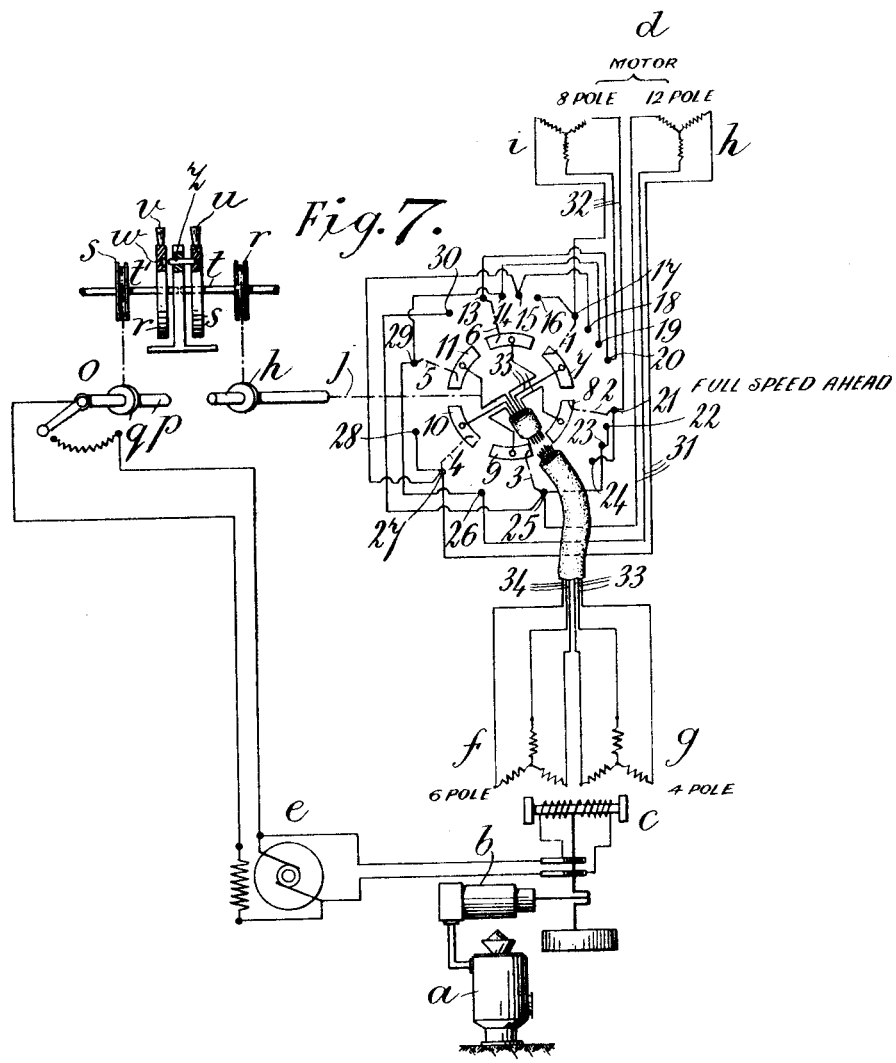

H. A. MAVOR.
POWER INSTALLATION FOR THE PROPULSION OF MARINE VESSELS AND FOR OTHER PURPOSES.
APPLICATION FILED JULY 1, 1911.
1,071,070.
Patented Aug. 26, 1913
5 SHEETS—SHEET 5.
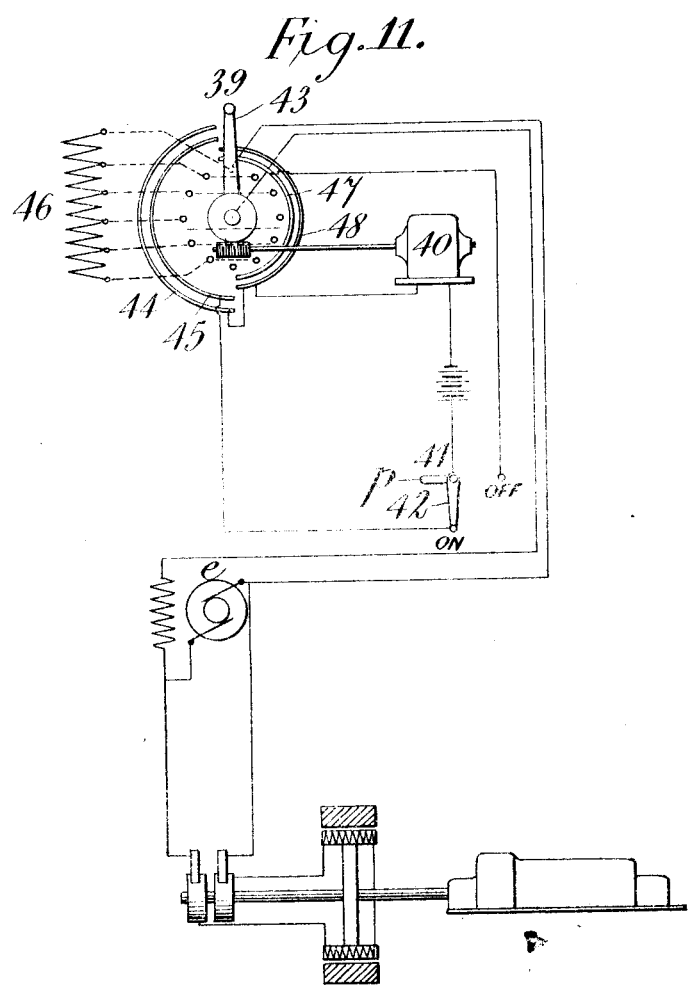

UNITED STATES PATENT OFFICE.

HENRY ALEXANDER MAVOR, OF GLASGOW, SCOTLAND.

POWER INSTALLATION FOR THE PROPULSION OF MARINE VESSELS AND FOR OTHER PURPOSES.

1,071,070.

Specification of Letters Patent.   Patented Aug. 26, 1913.

Application filed July 1, 1911.   Serial No. 636,484.

*To all whom it may concern:*

Be it known that I, HENRY ALEXANDER MAVOR, a subject of the King of Great Britain and Ireland, residing at Mile End, in the city and county of Glasgow, Scotland, have invented Improvements Relating to Power Installations for the Propulsion of Marine Vessels and for other Purposes, of which the following is a specification.

This invention relates to that class of power installation for the propulsion of marine vessels or other bodies the speed whereof it is desired should be changed from time to time, which comprises a prime mover system, an electric generator system driven thereby and an electric motor system supplied by the generator system.

In many cases if the prime mover system embodies, for example, an internal combustion engine adapted to derive its fuel from a suction gas producer, or a turbine supplied with superheated steam, it is necessary for economy and convenience to run the engine or turbine continuously notwithstanding that the demand for power may be intermittent.

The primary object of the present invention is to provide arrangements, embodying a mechanical interconnection between controlling means for the motor system and the regulating switch of an exciter for the generator system, in which all the conductors, switch gear and electrical elements as aforesaid, are calculated and constructed so as to withstand the maximum currents occurring during say maneuvering operations, the mechanical interconnection serving to introduce a time interval, that is to say, a safety interval wherein the motor controller cannot ordinarily be operated to alter the circuit relationship until the controller associated with the generator system is moved to some definite safe position and vice versa, so that normally the maximum currents cannot be suddenly established, without, however, preventing the plant being operated on emergency by other means that are not dependent on the time interval. In this way all the exigencies of practice involving normal and abnormal speed control are met without interfering with the prime mover system.

In the accompanying drawings Figure 1 is a diagrammatic view showing an elevation of one face of a device according to the invention used for controlling the power applied to the vessel and an elevation of the motor controller of the plant. Fig. 2 is a sectional face elevation of the power controlling device and Fig. 3 a part sectional side elevation of the motor controller. Fig. 4 is a diagrammatic view showing an elevation of the opposite face of the device for controlling the power applied to the vessel and an elevation of the exciter field regulator of the electric generator of the plant. Fig. 5 is a sectional side elevation of the power controlling device and Fig. 6 is a part sectional side elevation of the exciter field regulator. Figs. 7 to 10 inclusive are diagrams illustrating the controller connections in different positions. Fig. 11 is a diagram of a modified arrangement of the plant.

Referring to Fig. 7 of the said drawings, the plant comprises a suction gas producer $a$ using either anthracite or bituminous coal, an internal combustion engine $b$, a multifrequency generator $c$ of a known kind from which current of one of a number of different periodicities can be derived at any one time or currents of all the periodicities simultaneously, and a motor $d$ of multiple type comprising windings that can be used individually or collectively to suit speed and power requirements. $e$ is the exciter for the generator. As contemplated in the said diagram Fig. 7, the generator comprises a six pole winding $f$ and a four pole winding $g$ while the motor comprises a twelve pole winding $h$ and an eight pole winding $i$.

$j$ represents a motor control switch which, as shown in Figs. 1 and 3, comprises a set of brushes 1, 2, 3, 4, 5 and 6 carried by a spider $k$ and adapted to be moved in relation to stationary segments 7, 8, 9, 10, 11 and 12, and stationary contacts 13 to 30, through angular displacement of a shaft $m$ through a chain wheel $n$.

$o$ represents an ordinary rheostatic switch adapted to include resistance in and cut it out of the exciter circuit in opening and closing the same. As shown in Figs. 4 and 6, the shaft $p$ of this switch is moved from "on" to "off" position by angular displacement of a chain wheel $q$. The controller $j$ and switch $o$ are actuated from any part of the ship by the chain wheels $r$ and $s$ respectively of the mechanism shown in Figs. 2 and 5. The wheel r is fixed on a shaft t provided with a handle u so that the wheel can be moved to correspond with the conventional indication Full and Half ahead, Stop, and Full and Half astern. The wheel s is fixed on a shaft t¹ provided with a handle v so that the wheel can be moved to correspond with the off and on positions of the exciter switch. The wheel r is formed with four holes w, two whereof are shown in Fig. 2, corresponding to the running position of the motor controller j, and the wheel s with a recess x corresponding to "off" position of the exciter switch.

y, Figs. 2 and 5, is a stationary housing containing a spring-pressed plunger z tending always to advance toward the wheel s. The arrangement is such that, as long as the handle v is in the "off" position, the plunger z extends into the recess x in the wheel s and the wheel r is free to be rotated by the handle u, and until the said wheel r is in position to permit the plunger z to enter one of the holes w in it, the handle v cannot be operated to complete the circuit of the exciter. If axial movement of the plunger z is unresisted by the wheel r, the movement of the handle v will cause one of other of inclined end faces of the recess x to displace the plunger endwise. In a similar way, the handle u cannot be manipulated to alter the running conditions of the motor without first returning the handle v to the off position to render the exciter inoperative.

The controller connections may be as indicated respectively in Figs. 7, 8, 9, and 10 to meet the different running conditions of full speed and half speed ahead and half speed and full speed astern, "half" speed being in reality two thirds of the full speed. In these diagrams, 31 represents the group of three conductors for the supply of three-phase currents to the 12 pole windings h of the motor; 32 the group of three conductors for the supply of three phase currents to the eight pole winding i of the motor, 33 the group of conductors leading from the four pole winding g of the generator and 34 the group of conductors leading from the six pole winding f of the generator. Thus, in Fig. 7 (Full speed ahead), group 34 from the six pole winding f of the generator is connected to group 31 of the twelve pole winding h of the motor by way of brushes 3, 4 and 5, and group 33 from the four pole winding g of the generator is connected to group 32 of the eight pole winding of the motor by way of brushes 1, 2 and 6. In Fig. 8 (Half speed ahead), group 33 from the four pole winding g is connected to group 31 of the twelve pole winding h of the motor by way of brushes 1, 2 and 6. In Fig. 9 (Half speed astern), group 33 from the four pole winding g is connected to group 31 of the twelve pole winding h of the motor, the connections however being reversed. In Fig. 10 (Full speed astern), group 34 from the six pole winding f of the generator is connected to group 31 of the twelve pole winding h of the motor, and group 33 from the four pole winding g of the generator is connected to group 32 of the eight pole winding i of the motor, the connections being similar to those of Fig. 9 but reversed.

As will appear from Figs. 1 and 3, the shaft m is adapted to be connected to the chain wheel n through a locking pin 35 mounted upon a hand wheel 36 keyed to the said shaft, the arrangement being such that the shaft m can be operated directly by the hand wheel by simply unlocking the latter from the chain wheel n when it is desired to manipulate the motor controller independently. In like manner the shaft p of the rheostatic switch shown in Figs. 4 and 6 may be locked to its chain wheel q by a pin 37 and hand wheel 38 for a similar purpose.

Fig. 11 illustrates a modification wherein the exciter circuit is controlled by a switch 39 driven by a motor 40, as described in the specification of Letters Patent No. 944,453 granted to me, the circuit of the said motor being arranged to be opened and closed by a switch 41 operated as is the switch o of the arrangement herein first described. The time interval contemplated according to the invention can be varied as required, being, in the case of the arrangement shown in Fig. 11, altered by arranging the motor 40 to be driven at different speeds. Briefly stated, when the arm 42 of the switch 41 is in "on" position, as shown, the arm 43 provided with a brush (not shown) adapted to bridge the segments 44 and 45, will have been driven clockwise by the motor to the position shown where it will have cut out all the resistance 46 from the exciter field circuit and become engaged with segments 47 and 48. When therefore the switch arm 42 is next moved to the "off" position, the circuit of the motor is completed by way of the segments 47 and 48 and another brush (not shown) on the arm 43, thus causing the latter to be moved until it leaves the segments 47, 48 and engages segments 44 and 45 and in so doing cut the resistance 46 into the exciter circuit.

What I claim is:—

1. In a power installation comprising, an electric generator system embodying a separately driven exciter, and an electric motor system supplied by the generator system, manually operated means controlling connections between the generator and motor systems, manually operated means controlling the exciter of the generator system, and interlocking means between both controlling means adapted to prevent one such means being operated except when the other such means occupies some predetermined position in relation thereto.

2. In an electric power installation of the kind described, the combination with a motor controller and an exciter switch, of manually actuated means for operating the motor controller, manually actuated means for controlling the operation of the exciter switch, mechanism associated with both of said means, adapted to introduce a time interval between the actuation of one such means and the actuation of the other of such means, and devices adapted to permit either controller to be operated independently on emergency.

3. In an electric power installation of the kind described, the combination with a motor controller and an exciter controller, of manually actuated means for operating the motor controller, manually actuated means, interlocked with the aforesaid means, adapted to permit the exciter controller to be operated after a predetermined time interval and devices adapted to permit either controller to be operated independently on emergency.

4. In an electric power installation of the kind described, the combination with a generator and a power motor of an exciter and a motor driven exciter switch therefor, a controller for the power motor, a controller for the exciter switch motor, means for manually operating either controller separately, and interlocking means for preventing the operation of one controller except when the other controller occupies some predetermined position.

Signed at Glasgow, Scotland, this 20th day of June, 1911.

HENRY ALEXANDER MAVOR.

Witnesses:
THOMAS RITCHIE,
JAMES PATON.